United States Patent

[11] 3,600,856

[72] Inventor Eldon L. Burn
2717 S. 107th Ave., Omaha, Nebr. 68124
[21] Appl. No. 9,597
[22] Filed Feb. 9, 1970
[45] Patented Aug. 24, 1971

[54] CLOSURE MECHANISM FOR PANEL OPENING
10 Claims, 6 Drawing Figs.
[52] U.S. Cl. ................................................. 49/324,
98/41, 98/96
[51] Int. Cl. .................................................. E05f 11/34
[50] Field of Search ........................................ 49/324;
98/41, 96

[56] References Cited
UNITED STATES PATENTS
854,595 5/1907 Newey ....................... 49/324 X
FOREIGN PATENTS
1,203,113 7/1959 France ........................ 98/96

Primary Examiner—Kenneth Downey
Attorney—George R. Nimmer

ABSTRACT: This invention relates to a closure mechanism for panel openings and comprising a plate member, a central portion of which is mounted onto a transversely reciprocatable plunger means whereby the plate member is maintained in substantial parallelism with the plane of the panel opening both during the "open" and "closed" conditions of the panel opening.

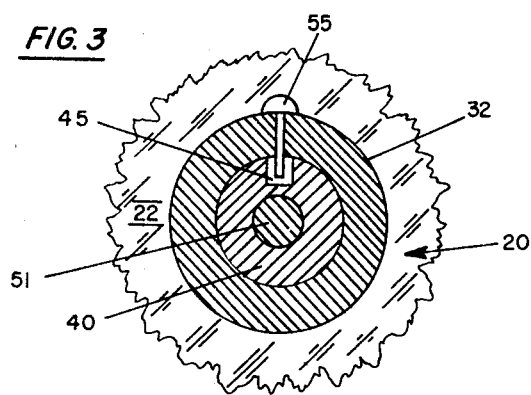
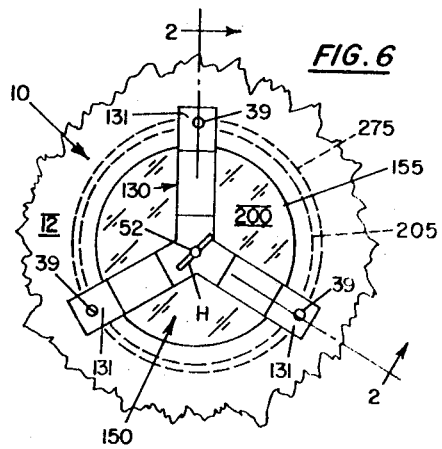
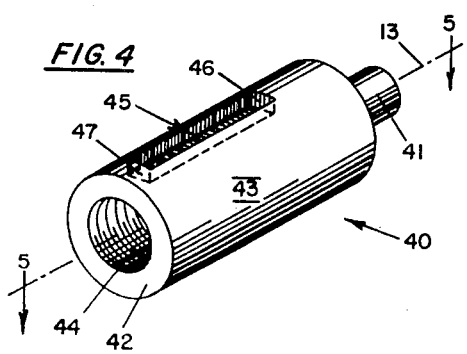
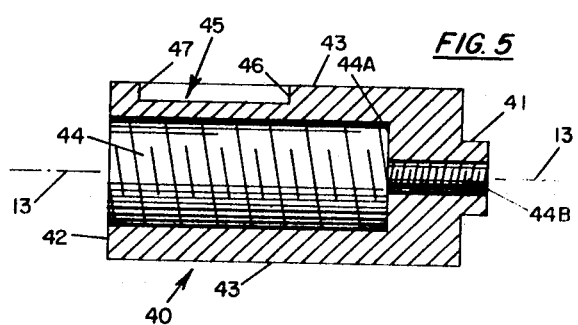
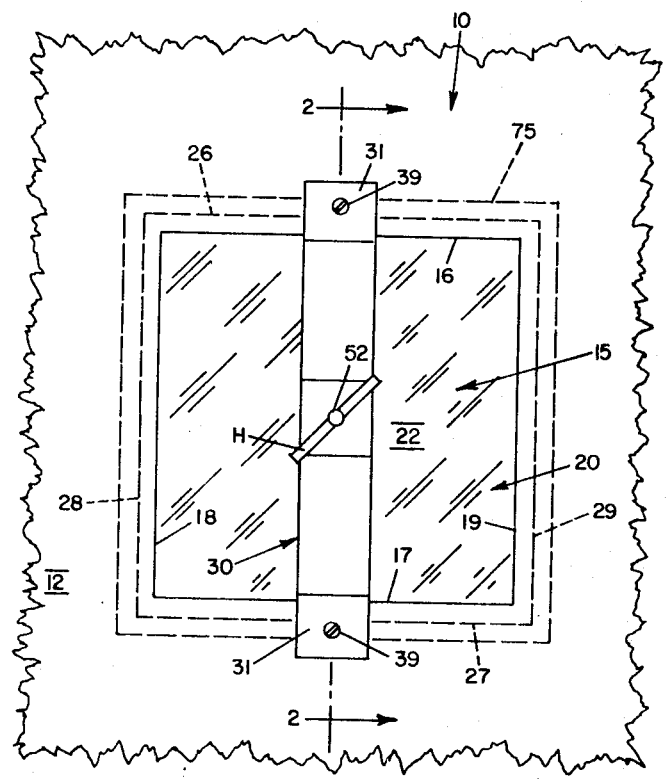

ELDON L. BURN
INVENTOR.

BY
ATTORNEY

CLOSURE MECHANISM FOR PANEL OPENING

Panellike structural members are commonly employed for the internal and external walls of dwelling homes, office buildings, warehouses, and the like, and also analogously employed as walls for transportation vehicles such as boats, automobiles, motor buses, aircraft, and the like. Oftentimes openings are employed as ventilation means for such panellike structural members, and in such cases it being desirable to provide platelike closure means such as translucent glass panes or even opaque panes to partially or fully selectively close the panel opening.

The prior art teaches three general types of platelike closure means for panel openings. First, there is the sliding-type closure means exemplified by the double-hung window wherein the slidably closeable plate member remains within the plane of the panel opening, the main disadvantage of this type closure means being an inherently limited degree of ventilation usually limited dimensionally to about 50 percent of the panel opening size. Second, there is the pivotal-type closure means wherein a single peripheral edge of the plate member is pivotably attached to the panel, the main disadvantage of this type closure means being excessive projections of the plate member away from the panel to fully ventilate through the panel opening. Third, there is the scissors-type closure means wherein the entire periphery of the plate member is effectively attached to the periphery of the panel opening with a scissors-type linkage whereby the plate member is maintainable in substantial parallelism with the plane of the panel opening; the main disadvantages of the scissors-type closure means are the expense of the scissors-type linkage, the impediment thereof to airflow characteristics, and the troublesome operational characteristics of scissors-type linkages generally.

It is accordingly the general object of the present invention to provide an improved closure means for panel openings that overcomes the several deficiencies and disadvantages of prior art closure mechanisms.

It is a specific object of the present invention to provide a closure mechanism that will provide an unusually high degree of ventilation through a panel opening with a minimal degree of outward extension of the plate member from the panel.

It is another object of the present invention to provide a closure mechanism that is amenable to panel openings and plate members of various geometrical shapes including polygonal, circular, and even highly irregular shapes.

It is a further object to provide a closure mechanism that is amenable to and adaptable for various kinds of panel structures and environmental situations therefor.

It is another object to provide a closure mechanism that is economical to build and maintain and that is of exceedingly reliable operational characteristics.

It is a further object to provide a closure mechanism that is amenable to various kinds of plate member materials including transparent, translucent, and opaque.

With the above and other objects and advantages in view, which will become more apparent as the description proceeds, the closure mechanism for a panel transverse opening generally comprises: a plate member located alongside the panel and coparallel to the panel opening, said plate member having a plate boundary annularly surrounding the boundary of the panel opening; a support member located transversely of the panel opening and rigidly attached to the panel; and a plunger means including a forward portion thereof attached to a central portion of the plate member, said plunger means being transversely reciprocatably connected to the support member whereby alternate transverse movements of the plunger means will effectively abuttably close the panel opening with the dimensionally larger plate member, and will alternatively provide an uninterrupted annular spatial gap "G" between the plate boundary and the panel opening.

In the drawing, wherein like characters refer to like parts in the several views, and in which:

FIG. 1 is a rearward elevational view of a representative embodiment of the closure mechanism of the present invention, specifically in combination with an arbitrarily selected rectangular shape for the panel opening.

FIG. 3 is a sectional elevational view taken along line 3—3 of FIG. 2.

FIG. 4 is a perspective detail view of a spindle component of the preferred plunger means portion of the closure mechanism.

FIG. 5 is a sectional elevational view taken along line 5—5 of FIG. 4.

FIG. 6 is a rearward elevational view similar to FIG. 1 wherein the arbitrarily selected shape for the panel opening is circular.

Figure 2:
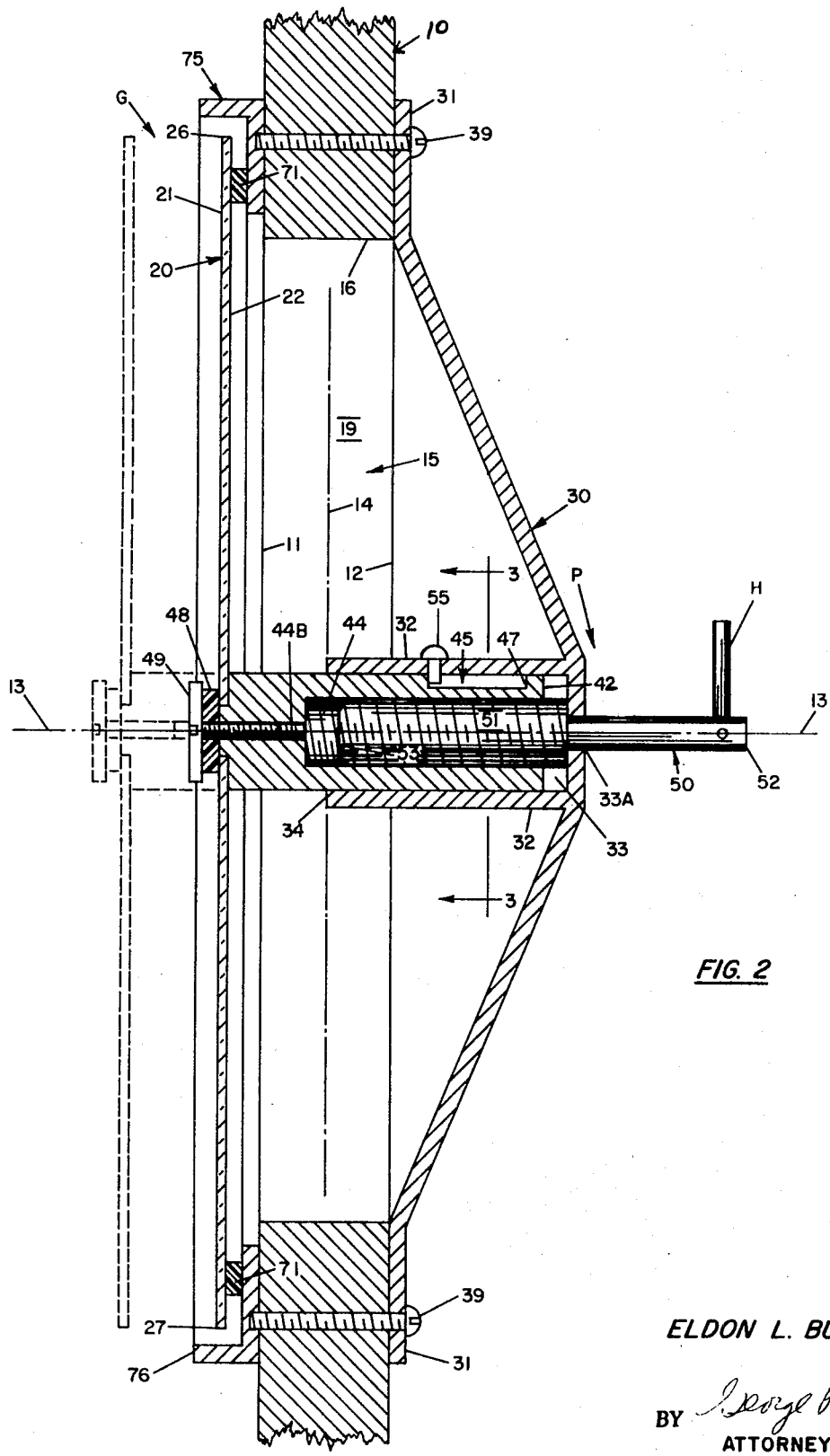
FIG. 2 is a sectional elevational view taken primarily along line 2—2 of FIG. 1.

The environment for the closure mechanism comprises a panel 10 which might provide the wall of a building structure, motor vehicle, trailer, or the like, said panel 10 including a pair of opposed broad surfaces including a forward surface 11 and a rearward surface 12. While one or more of the panel surfaces 11 and 12 might be of a curved configuration, said surfaces herein are respectively herein substantially planar and coparallel whereby panel 10 is of an arbitrarily chosen uniplanar nature. The environment further includes a transverse opening 15 extending through both panel broad surfaces 11 and 12, the said panel opening 15 being defined by an annular panel boundary of an arbitrarily selected geometrical shape (herein as rectangular with four sides 16—19) surrounding a transverse axis 13. Another arbitrarily chosen geometric shape for the panel transverse opening is shown in FIG. 6 and defined by the circular panel boundary 155 of circular panel opening 150 which therein annularly circularly surrounds transverse axis 13.

The panel transverse opening, e.g. 15, 150, is closeable with a dimensionally larger plate member, e.g. 20, 200, which is located alongside and in substantial coparallelism with the panel opening, said plate member being transversely reciprocatable along transverse axis 13 through a suitable plunger means, e.g. P comprising elements 40, 50, 55, and H. Thus, alternate transverse directional movements of the plate member, e.g. 20, 200, will alternatively open and close the panel transverse opening with the plate member. For example, as indicated in phantom line for plate member 20 in FIG. 2, in the open condition there is a transverse spatial gap G between the entire plate boundary 26-29 of plate member 20 and the panel's annular abutment means, e.g. 11, 71; as indicated in solid line for plate member 20 in FIG. 2, in the closed condition the plate rearward surface 22 abuts the entire annular abutment means, e.g. 71.

Plate member 20 herein takes the form of a uniplanar rigid rectangular piece of translucent material, such as glass or the like, having a pair of opposed parallel broad surfaces including forward surface 21 and further including rearward surface 22 located herein permanently forwardly of panel forward surface 11. Plate member 20 has a plate boundary annularly surrounding both transverse axis 13 and the panel boundary 16-19, said plate boundary being preferably of similar geometric shape to the panel boundary and accordingly herein the plate boundary is rectangular with four sides 26-29. The plate member is attached to a forward portion of the plunger means P, said attachment being wholly accomplished at the central portion of the plate member as by setscrew 49 passing through the plate member along transverse axis 13 and extending into spindle 40 at threaded bore portion 44B. It is exceedingly desirable, particularly when noncircular panel boundaries and plate boundaries are employed, that the plate member be relatively fixed with respect to the transversely reciprocatable plunger means such that the plate boundary 26-29 be nonrotatable with respect to transverse axis 13.

There is a rigid support member, e.g. 30, 130, located rearwardly of plate member 20 and rearwardly of panel 10, said support member being rigidly attached to panel 10 as by means of screws 39. The rigid support member 30 rearwardly offset of panel opening 15 intersects transverse axis 13. In the case of translucent windowlike plate members, and as exemplified in FIGS. 1 and 6, the rearwardly projected surface area of opaque support members preferably bears a ratio of less than about one-fourth with respect to the rearwardly projected surface area of the panel opening so as to provide minimum impediment to light transmission. The vertical rigid bar metallic support member 30 of FIGS. 1 and 2 includes upper and lower terminal portions 31 abutting panel rearward surface 12 adjacent to panel edges 16 and 17 while intermediate portions of support member 30 particularly at transverse axis 13 are rearwardly offset of abutment means 71 and of panel rearward surface 12. Support member 30 includes a transverse bore 33 disposed along transverse axis 13, said transverse bore 33 herein being defined by a hublike collar central portion 32 annularly circular surrounding transverse axis 13. The hublike collar has a uniplanar forward end 34 positioned rearwardly of panel vertical axis 14 and of forward surface 11. Circular transverse bore 33 is diametrically smaller at its rearward portion 33A than at its preponderant length nearer to 34.

As has already been alluded to, the plunger means portion of the closure mechanism is attached to the plate member and is transversely reciprocatable along, and preferably nonrotatable about, transverse axis 13 so as to permit selective opening and closing of the panel opening with the plate member. The plunger means preferably includes a handle means, e.g. H, extending rearwardly of the support member to facilitate transverse movement of the plunger means.

The preferred plunger means P herein comprises spindle component 40, shaft 50, and pin 55. The spindle component 40 shown in the FIGS. 4 and 5 detail views and in the FIGS. 2 and 3 assembly views. Spindle 40 is generally of cylindrical tubular form including a rearward end 42, a narrower circular forward portion 41, and a transversely extending external surface 43 circularly surrounding transverse axis 13. Spindle 40 has a threaded circular axial bore 44 commencing at rearward end 42 and extending forwardly therefrom at constant diameter to 44A, the forward minor length portion 44B of said axial bore being diametrically smaller. The spindle transversely extending sidewall is provided with a transversely extending slotted portion 45 of finite transverse length including forward end 46 and rearward end 47. As will be explained later in greater detail, the slot length 46–47 determines the maximum degree of transverse movement of the plate member with respect to the panel opening. Attachment between the plate member, e.g. 20, 200, which is provided with a central opening along transverse axis 13, and the plunger means is afforded with a set screw 49 extending through the plate member central opening into axial bore forward portion 44B, there being herein a washer 48 interposed between the plate forward side 21 and the setscrew head end.

There is an elongate shaft 50 extending along transverse axis 13, said shaft comprising two integrally connected cylindrical portions including a larger diameter forward portion 51 (with forward end 53) threadedly engaged with spindle axial bore portion 44 and said shaft integrally including a smaller diameter nonthreaded portion 52 disposed within transverse bore portion 33A. The transverse elongate length of each shaft portion 51 and 52 exceeds the slot elongate length 46–47. A vertical pin 55 extends through hublike collar 32 into spindle slotted portion 45. Thus, as shaft 50 is made to rotate about transverse axis 13, as by manipulation of radial handle H on shaft portion 52, spindle 40 and plate member 20 are caused to move transversely along transverse axis 13, the extent of transverse movement being governed by pin 55 abutting against the respective slot ends 46 and 47. Moreover, the diameter of pin 55 is substantially equal to the narrower width dimension of slot 45 whereby rotation of spindle 40 and plate member 20 about transverse axis 13 is prevented during transverse movement of said plunger means P.

Although during closing of the panel opening the plate member rearward surface might abut directly against the panel forward surface 11, the use of an annular abutment gasket 71 surrounding panel opening 15 and attached to panel 10 ensures a weathertight seal between plate member 20 and panel opening 15. In this vane, resiliently compressible resinous materials such as rubber are preferred for the annular abutment gasket 71. Moreover, the annular abutment gasket, e.g. 71, is desirably geometrically similar to, but effectively dimensionally smaller than, the plate boundary, e.g. 26–29, 155, respectively. Herein, there is an annular framework 75 surrounding the plate boundary and which is attached to panel 10 as by screws 39; framework 75 carries annular gasket 71 rearwardly recessed from the forward annular extremity 76 thereof so as to further ensure a weathertight seal between the plate member and the panel opening.

Operation of the panel opening closure mechanism herein, which has already been alluded to, can be summarized as follows. Assuming that plate member 20 abuts the gasket abutment means 71 and pin 55 is at slot end 46 as indicated in solid line in FIG. 2 so that panel opening 15 is closed, shaft 50 is rotated about transverse axis 13 through manipulation of handle H whereupon spindle 40 and plate member 20 (but not shaft 50 and handle H) move transversely forwardly along transverse axis 13 whereupon panel opening 15 becomes progressively more open until pin 55 is at slot end 47, as indicated in phantom line in FIG. 2. Reverse rotation of shaft 50 about transverse axis 13 would result in eventual closing of panel opening 15 as indicated in solid line in FIG. 2.

The alternate closure mechanism of FIG. 6 is essentially structurally and operationally identical to that of FIGS. 1 and 2, except differing in the following structural respects only. First, the panel opening as 150 has a panel boundary 155 that is circularly concentric about transverse axis 13. Second, the plate member as 200 has a plate boundary 205 that circularly concentrically surrounds panel boundary 155. Third, the framework as 275, which is analogous to framework 75, circularly concentrically surrounds plate boundary 205 and a circularly annular abutment gasket (not shown) that is analogous to 71. Fourthly, the rigid support member as 130 differs from support member 30 in having three terminal portions 131 compared to two terminal portions 31 in FIG. 1.

From the foregoing, the construction and operation of the closure mechanism will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. In combination with a panel having a pair of opposed broad surfaces including a forward surface and a rearward surface and having a transverse opening extending through both panel surfaces, the panel transverse opening being defined by an annular panel boundary of a given geometrical shape annularly surrounding a transverse axis, a closure mechanism for said panel transverse opening comprising:

A. A plate member located alongside of and disposed in substantial coparallelism with the panel opening, said plate member having a plate boundary surrounding both the transverse axis and the panel boundary;

B. A rigid support member located rearwardly of the plate member, said support member being rigidly attached to the said panel and intersecting the said transverse axis; and C. A plunger means located rearwardly of the plate member, the forward portion of said plunger member comprising a transversely extending spindle that is attached to a central portion of the plate member and that is transversely reciprocatably associated with the support member, said spindle portion commencing at the rearward end thereof being provided with a forwardly extending threaded axial bore, said plunger member also comprising a shaft threadedly engaged with the spindle axial bore rearwardly of said plate member and extending transversely rearwardly therefrom beyond the support member whereby alternate rotational directional movements of the plunger member shaft portion will cause the spindle portion to move along the transverse axis to alternately close the panel transverse opening with the plate member and will also alternately provide an uninterrupted annular spatial gap opening between the plate boundary and the panel boundary.

2. The closure mechanism of claim 1 wherein the plate member is located wholly forwardly of the panel opening; wherein the panel at the forward side thereof carries an annular abutment gasket for the plate rearward side, the said annular abutment gasket surrounding the panel boundary, the plate boundary surrounding the said annular gasket; wherein the entire support at the transverse axis is disposed wholly rearwardly of said annular gasket; and wherein the rearward transverse directional movement of the plate member will close the panel transverse opening.

3. The closure mechanism of claim 1 wherein the plate member and the spindle each has a fixed nonrotational relationship with respect to the transverse axis as the plunger member is caused to reciprocate along said transverse axis.

4. The closure mechanism of claim 2 wherein the support member is provided with a transverse bore extending along the transverse axis; wherein the rearwardly projected area of the support means bears a ratio of less than about one-fourth with respect to the rearwardly projected surface area of the panel opening; and wherein the plunger shaft portion includes a handle portion extending rearwardly of the support member.

5. The closure mechanism of claim 4, wherein the panel is substantially uniplanar including a pair of opposed parallel planar broad surfaces and a substantially uniplanar panel opening; wherein the plate member is substantially uniplanar including a uniplanar rearward surface that is maintained in substantial parallelism with the panel forward surface; wherein the support member has a hublike collar central portion surrounding the transverse axis to provide the support member transverse bore, said collar being located wholly rearwardly of the abutment gasket; and wherein the plate member annular plate boundary has a fixed nonrotational relationship with respect to the transverse axis as the plunger member is caused to reciprocate along said transverse axis.

6. The closure mechanism of claim 5 wherein the panel at the forward side thereof carries an annular framework surrounding the panel boundary, said framework being geometrically similar to and surrounding the plate boundary, the abutment gasket being rearwardly recessed from the annular forward extremity of the framework and being provided of a resiliently compressible resinous material.

7. The closure mechanism of claim 5 wherein the plate boundary is geometrically similar to and concentric about the panel boundary, the said transverse axis providing a geometric center for said plate boundary and said panel boundary.

8. The closure mechanism of claim 5 wherein the spindle is of generally cylindrical shape and disposed along the support member transverse bore, said spindle transverse sidewall circularly surrounding the transverse axis, said spindle having a rearward end and having a forward end removably rigidly attached to the substantial geometric center of the plate member, said spindle having a threaded axial bore extending forwardly from the rearward end thereof along said transverse axis, said spindle sidewall being provided with a transversely extending elongate slot of finite transverse length, a pin extending through the collar member into the elongate slotted portion of the spindle, a shaft extending along the transverse axis and including a forward portion threadedly engaged with the axial bore of the spindle, and a radial handle member attached to the shaft rearward portion.

9. The closure mechanism of claim 8 wherein the forward extremity of the support member hublike collar is disposed rearwardly of the panel forward surface whereby the forward portion of the spindle extends forwardly of said hublike collar; wherein the elongate length of the spindle threaded axial bore exceeds the finite transverse length of the spindle sidewall elongate slot; wherein the plunger member shaft includes a nonthreaded rearward portion extending transversely rearwardly through the support member rearward end, the diameter of the shaft-threaded forward portion exceeding the diameter of the shaft nonthreaded rearward portion, the elongate length of the shaft threaded forward portion exceeding the finite transverse length of the spindle sidewall elongate slot; wherein the diameter of the collar member pin is substantially equal to the narrower width dimension of the spindle elongate slot whereby the spindle is slidably disposed along the collar member pin and has a fixed angular relationship with respect to the transverse axis as the plunger member transversely reciprocates; and wherein the plunger member handle means is attached to the shaft nonthreaded portion rearwardly of the support means.

10. In combination with a panel having a forward surface and a rearward surface and having a transverse opening therethrough that is defined by a panel boundary annularly surrounding a transverse axis, a closure mechanism for said panel transverse opening comprising:
A. A plate member located alongside of and disposed in substantial coparallelism with the panel opening, said plate member having a plate boundary surrounding the panel boundary;
B. A support member rigidly attached to said panel, said support member including a hublike collar portion that is disposed a fixed distance rearwardly from the panel and that is provided with a transverse bore, the rearwardly projected area of the support member including the hublike collar portion thereof bearing a ratio of less than about one-fourth with respect to the rearwardly projected surface area of the panel opening;
C. A transversely extending spindle being disposed within the hublike collar transverse bore and in transversely movable and nonrotatable relationship therewith, the forward portion of said spindle forwardly of the hublike collar being attached to said plate member, said spindle commencing at the rearward end thereof being provided with a forwardly extending threaded axial bore; and
D. A transversely fixed elongate shaft threadedly engaged with the spindle axial bore, said shaft having a forward end that is rearwardly offset from the plate member and having a rearward end located rearwardly of the support member hublike collar whereby rotation of said shaft rearwardly of the hublike collar will cause nonrotatable transverse movement of the spindle and attached plate member.